(12) United States Patent
Karpik et al.

(10) Patent No.: US 11,668,244 B2
(45) Date of Patent: Jun. 6, 2023

(54) DECOUPLER FOR ENGINE STARTER

(71) Applicants: Unison Industries, LLC, Jacksonville, FL (US); GENERAL ELECTRIC COMPANY, Schenectady, NY (US)

(72) Inventors: Roberto Karpik, Warsaw (PL); Subrata Nayak, Karnataka (IN); David Allan Danschak, Union, OH (US); Shiloh Montegomery Meyers, Miamisburg, OH (US); Sharad Pundlik Patil, Karnataka (IN); Eliel Fresco Rodriguez, Springboro, OH (US)

(73) Assignees: UNISON INDUSTRIES, LLC, Jacksonville, FL (US); GENERAL ELECTRIC COMPANY, Schenectady, NY (US)

( * ) Notice: Subject to any disclaimer, the term of this patent is extended or adjusted under 35 U.S.C. 154(b) by 159 days.

(21) Appl. No.: 17/183,975

(22) Filed: Feb. 24, 2021

(65) Prior Publication Data
US 2021/0293184 A1  Sep. 23, 2021

(51) Int. Cl.
| | |
|---|---|
| *F02C 7/277* | (2006.01) |
| *F02C 7/06* | (2006.01) |
| *F02C 7/36* | (2006.01) |
| *F01D 5/02* | (2006.01) |
| *F01D 15/12* | (2006.01) |
| *F01D 25/16* | (2006.01) |

(52) U.S. Cl.
CPC .............. *F02C 7/277* (2013.01); *F01D 5/026* (2013.01); *F01D 15/12* (2013.01); *F01D 25/16* (2013.01); *F02C 7/06* (2013.01); *F02C 7/36* (2013.01); *F05D 2240/50* (2013.01); *F05D 2240/61* (2013.01); *F05D 2260/31* (2013.01); *F05D 2260/4023* (2013.01); *F05D 2260/40311* (2013.01); *F05D 2260/85* (2013.01); *F16D 2500/10462* (2013.01)

(58) Field of Classification Search
None
See application file for complete search history.

(56) References Cited

U.S. PATENT DOCUMENTS

| | | | |
|---|---|---|---|
| 2,937,730 | A | 5/1960 | Quenneville |
| 3,048,364 | A | 8/1962 | Troeger et al. |
| 3,536,174 | A | 10/1970 | Vance |
| 3,713,518 | A | 1/1973 | Hawkins |
| 3,958,679 | A | 5/1976 | Tamarin |
| 4,543,074 | A | 9/1985 | Ville et al. |

(Continued)

FOREIGN PATENT DOCUMENTS

EP  2098741 A2  9/2009

*Primary Examiner* — Juan G Flores
(74) *Attorney, Agent, or Firm* — McGarry Bair PC

(57) ABSTRACT

An air turbine starter for starting an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas and a gear train is drivingly coupled with the turbine member. A drive shaft is operably coupled with the gear train, and a decoupler is selectively coupled to the drive shaft for decoupling the air turbine starter from the engine.

20 Claims, 11 Drawing Sheets

(56) References Cited

U.S. PATENT DOCUMENTS

| | | | |
|---|---|---|---|
| 4,871,296 A * | 10/1989 | Laessle | F16D 9/00 |
| | | | 60/788 |
| 6,059,085 A | 5/2000 | Farnsworth | |
| 7,591,356 B2 | 9/2009 | Guyader | |
| 8,105,018 B2 * | 1/2012 | Gockel | F02C 7/277 |
| | | | 415/122.1 |
| 10,526,974 B2 * | 1/2020 | Patil | F02C 7/277 |
| 2009/0199567 A1 * | 8/2009 | Gockel | F02C 7/32 |
| | | | 60/788 |
| 2017/0356345 A1 | 12/2017 | Rodriguez et al. | |
| 2018/0112723 A1 | 4/2018 | Pando Rodriguez et al. | |
| 2018/0328286 A1 | 11/2018 | Nayak et al. | |
| 2019/0032566 A1 | 1/2019 | Martinez et al. | |
| 2019/0048800 A1 * | 2/2019 | Patil | F16D 9/06 |

* cited by examiner

DECOUPLER FOR ENGINE STARTER

CROSS-REFERENCE TO RELATED APPLICATION(S)

This application claims priority to Polish Application No. P.433297, filed Mar. 19, 2020, which is incorporated herein by reference in its entirety.

TECHNICAL FIELD

The disclosure generally relates to a decoupler for disengaging a drive shaft from an engine, specifically a decoupler for an air turbine starter.

BACKGROUND

An aircraft engine, for example a gas turbine engine, is engaged in regular operation to an air turbine starter. The internal components of both the gas turbine engine and the air turbine starter can selectively spin together and can each include gearboxes allowing for step down or step up ratios between consecutive parts. To prevent back drive, an overrunning clutch is placed between the air turbine starter output shaft and the air turbine starter gearbox section. Back drive events can occur with an overrunning clutch failure in the engaged position, when the engine drives the output shaft of the air turbine starter resulting in over spinning a turbine rotor in the air turbine starter. In a back drive event, it can be desirable to decouple the air turbine starter from the gas turbine engine.

BRIEF DESCRIPTION

Aspects and advantages of the disclosure herein will be set forth in part in the following description, or can be made obvious from the description, or can be learned through practice of the disclosure herein.

In one aspect, the present disclosure relates to an air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member, a drive shaft operably coupled with the gear train, and a decoupler, comprising an output shaft extending axially between an output shaft first end coupled to the drive shaft and an output shaft second end configured to be operably coupled to and rotate with the engine, defining an interior including at least one output tab extending radially inward and at least one output slot extending radially outward, a connecting shaft extending axially between a connecting first end coupled to the drive shaft and a connecting second end located within the interior of the output shaft, a limiter cap comprising a limiting flanged end from which a hollow cap body extends operably coupled to the connecting second end of the connecting shaft, a locking shaft circumscribing the connecting shaft and including at least one locking tab axially engaged with the at least one output tab under a normal operating condition, a dog clutch having a dog flanged end and a hollow shaft extending axially from the dog flanged end, the hollow shaft circumscribing at least a portion of the limiter cap, the dog flanged end including at least one dog tab received within the at least one output slot of the output shaft under the normal operating condition.

In another aspect the present disclosure relates to a decoupler for selectively disengaging a drive shaft from an engine, the decoupler comprising an output shaft defining a hollow interior and having an output first end operably coupled to and rotatable with the drive shaft and an output second end operably coupled to and rotatable with the engine, and a decoupler shaft assembly located within the hollow interior and moveable between an engaged position wherein at least a portion of the decoupler shaft assembly is engaged with an interior surface of the output shaft and a disengaged position wherein the decoupler shaft assembly is decoupled from the output shaft in the disengaged position, wherein the decoupler shaft is manually resettable to the engaged position via rotation and axial movement and remains decoupled by preventing circumferential engagement of the output shaft with the decoupler shaft.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure herein.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
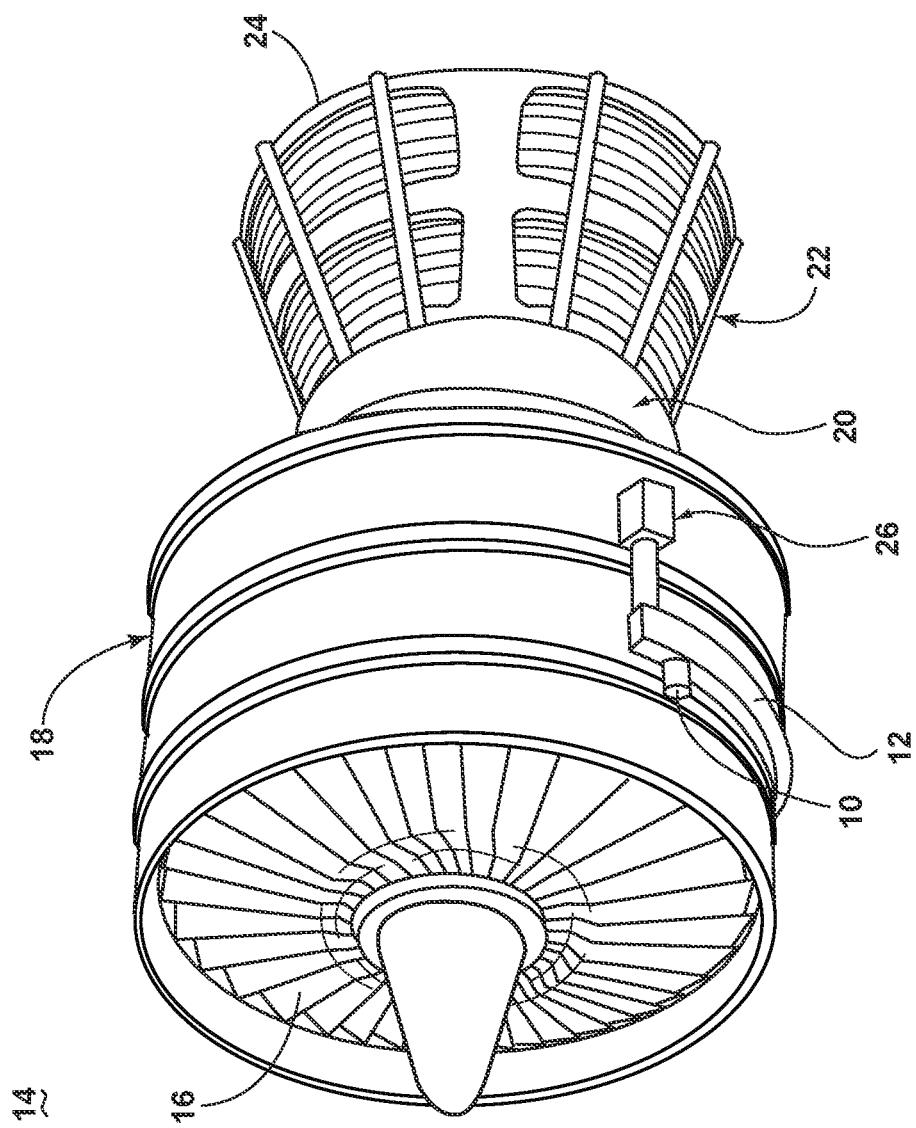
FIG. 1 is a perspective view of a turbine engine with an accessory gearbox and an air turbine starter in accordance with various aspects described herein.

The present disclosure is related to a driving mechanism generating kinetic motion in the form of a rotating shaft coupled with a piece of rotating equipment. One non-limiting example is coupling a starter containing more than one component onto an accessory gear box. The starter can have various applications including starting a gas turbine engine. While the examples described herein are directed to application of a turbine engine and a starter, the disclosure can be applied to any implementation of a driving mechanism that generates rotational motion at a driving output and provides the rotational motion to another piece of rotating equipment.

A conventional air-turbine starter (ATS) uses a mechanical unidirectional clutch, or teethed drive shaft, capable of only engaging in one direction as the primary mechanism to transmit torque to the auxiliary gearbox (AGB) while driving and disengages during engine overrun. Sometimes the reliability of a mechanical clutch is a concern for long term overall reliability and safety of an ATS. To enhance reliability, an additional feature called a back-drive decoupler or decoupler is placed in every ATS. More specifically, in order to ensure damage does not occur in the ATS, AGB, or the engine, a mechanism that prevents reengagement of the shaft of ATS with AGB is required. The back-drive decoupler transfers torque in the drive direction and decouples completely under a back-drive scenario in which the ATS clutch fails to disengage and the ATS turbine is being driven during engine overrun. Currently such decouplers are done through a mechanism or part that is damaged during decoupling.

The disclosure herein relates to an alternate approach for the back-drive decoupling feature that is reusable as it is not damaged and requires minimum maintenance as it is a manually reversible type of mechanism that does not need to be replaced with a new decoupler after a back-drive event. The mechanism described herein, which disengages during back-drive does not break or fracture any of the components and still meets the requirement that the ATS and AGB must remain disengaged.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Referring to FIG. 1, a starter motor or ATS 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14.

Under normal operating conditions, the power take-off 26 translates power from the turbine engine 14 to the AGB 12 to power accessories of the aircraft for example but not limited to fuel pumps, electrical systems, and cabin environment controls. The ATS 10 can be mounted on the outside of either the air intake region containing the fan 16 or on the core near the high pressure compression region 18.

Figure 2:
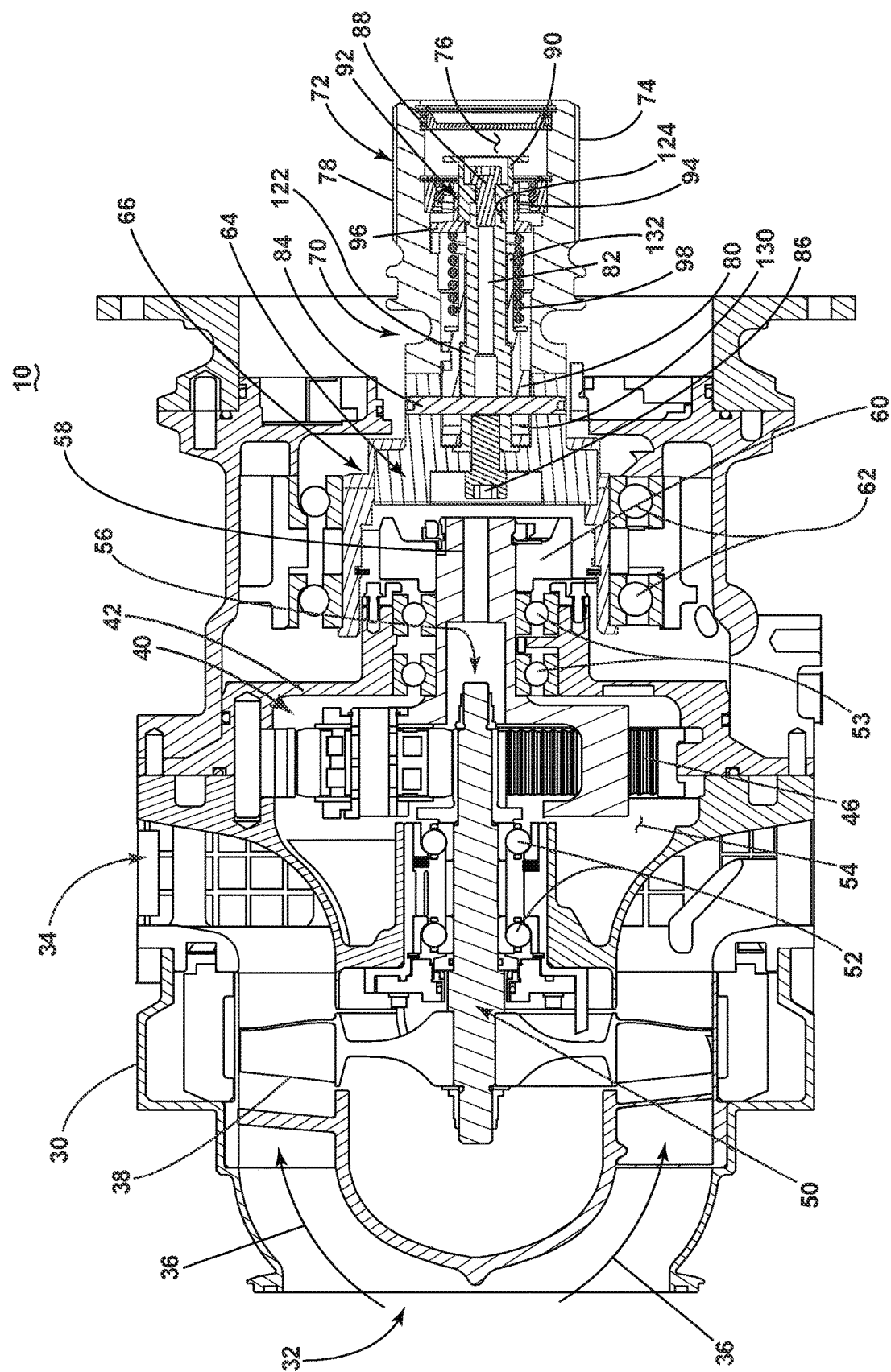
FIG. 2 is an enlarged cross-sectional view of an exemplary air turbine starter that can be included in FIG. 1 and including a decoupler.

Referring now to FIG. 2, the ATS 10, which can be mounted to the AGB 12 is shown in greater detail. Generally, the ATS 10 includes a housing 30 defining an inlet 32, an outlet 34, and a flow path 36 extending between the inlet 32 and outlet 34 for communicating a flow of gas there through. In one non-limiting example, the gas is air and is supplied from either a ground-operating air cart, an auxiliary power unit, or a cross-bleed start from an engine already operating. The ATS 10 includes a turbine member 38 within the housing 30 and disposed within the flow path 36 for rotatably extracting mechanical power from the flow of gas along the flow path 36. A gear box 42 is mounted within the housing 30. Further, a gear train 40, disposed within the gear box 42 and drivingly coupled with the turbine member 38, can be caused to rotate.

The gear train 40 includes a ring gear 46 and can further comprise any gear assembly including for example but not limited to a planetary gear assembly or a pinion gear assembly. A turbine shaft 50 couples the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. A gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 extends and meshes with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 40 and coupled to the AGB 12, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or combinations thereof. An example of a shaft interface portion is disclosed in U.S. Pat. No. 4,281,942 to General Electric and is incorporated herein by reference in its entirety.

The ATS 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the ATS 10 and, therefore, the aircraft.

The rotatable shaft 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. The diameter can vary to accommodate different sizes, as well as rotor to stator spacing.

As described herein, air supplied along the flow path 36 rotates the turbine member 38 for driving the rotation of the rotatable shaft 66. Therefore during starting operations, the ATS 10 can be the driving mechanism for the turbine engine 14 via rotation of the rotatable shaft 66. The non-driving mechanism, that is, the equipment being driven by the driving mechanism, can be understood as rotating equipment utilizing the rotational movement of the rotatable shaft 66, for example to generate electricity in the ATS 10.

The drive shaft 64 is further coupled to a decoupler 70. The decoupler 70 includes an output shaft 72, the output shaft 72 is hollow having a shaft exterior 74 and a hollow interior 76. The shaft exterior 74 can include, by way of non-limiting example, circumferentially distributed teeth 78 at a first end. The teeth 78 can be utilized to operably couple the output shaft 72 to rotate with a portion of the engine 14.

A decoupler shaft assembly 79 (FIG. 3) includes a locking shaft 80 and a connecting shaft 82. The decoupler shaft assembly 79 extends between the drive shaft 64 and the output shaft 72. The locking shaft 80 includes a hollow body and the connecting shaft 82 can extend through the locking shaft 80 and couple the drive shaft 64 to the output shaft 72. The connecting shaft 82 extends axially between a connecting first end 122 and a connecting second end 124. The locking shaft 80 can extend axially between a locking first end 130 and a locking second end 132. In the illustrated example, a pin 84 extends through the drive shaft 64, the locking first end 130, and the connecting first end 122 to rotationally couple them together. The connecting shaft 82 can be further coupled to the drive shaft 64 at the connecting second end 124 via, by way of non-limiting example, a drive bolt 86. The connecting shaft 82 extends from the drive shaft 64 through the hollow interior 76 and is mounted to the output shaft 72 via, by way of non-limiting example, an output bolt 88. The connecting shaft 80 provides rotational alignment between both the drive shaft 64 and output shaft 72.

A limiter cap 90 is provided within the hollow interior 76 and can be coupled to the connecting shaft 80 with the output bolt 88. The limiter cap 90 is configured to limit the axial movement of the decoupler 70.

A dog clutch 92 can include a hollow shaft 94 that selectively engages in an axial direction with the limiter cap 90. The dog clutch 92 can further include at least one dog tab 96 that can selectively engage a portion of the hollow interior 76 of the output shaft 72. As used herein the term "dog clutch" is a device that includes tabs for selectively engaging with slots in order to couple two shafts to transmit motion or disengage from slots to enable relative free motion.

A biasing mechanism 98 illustrated, by way of non-limiting example, as a compressive spring, can extend within the output shaft 72 and surround the locking shaft 80. It should be understood that while a compressive spring is illustrated, any suitable biasing mechanism 98 capable of supplying an axial force simultaneously on the locking shaft 80 and dog clutch 92 is contemplated.

Figure 3:
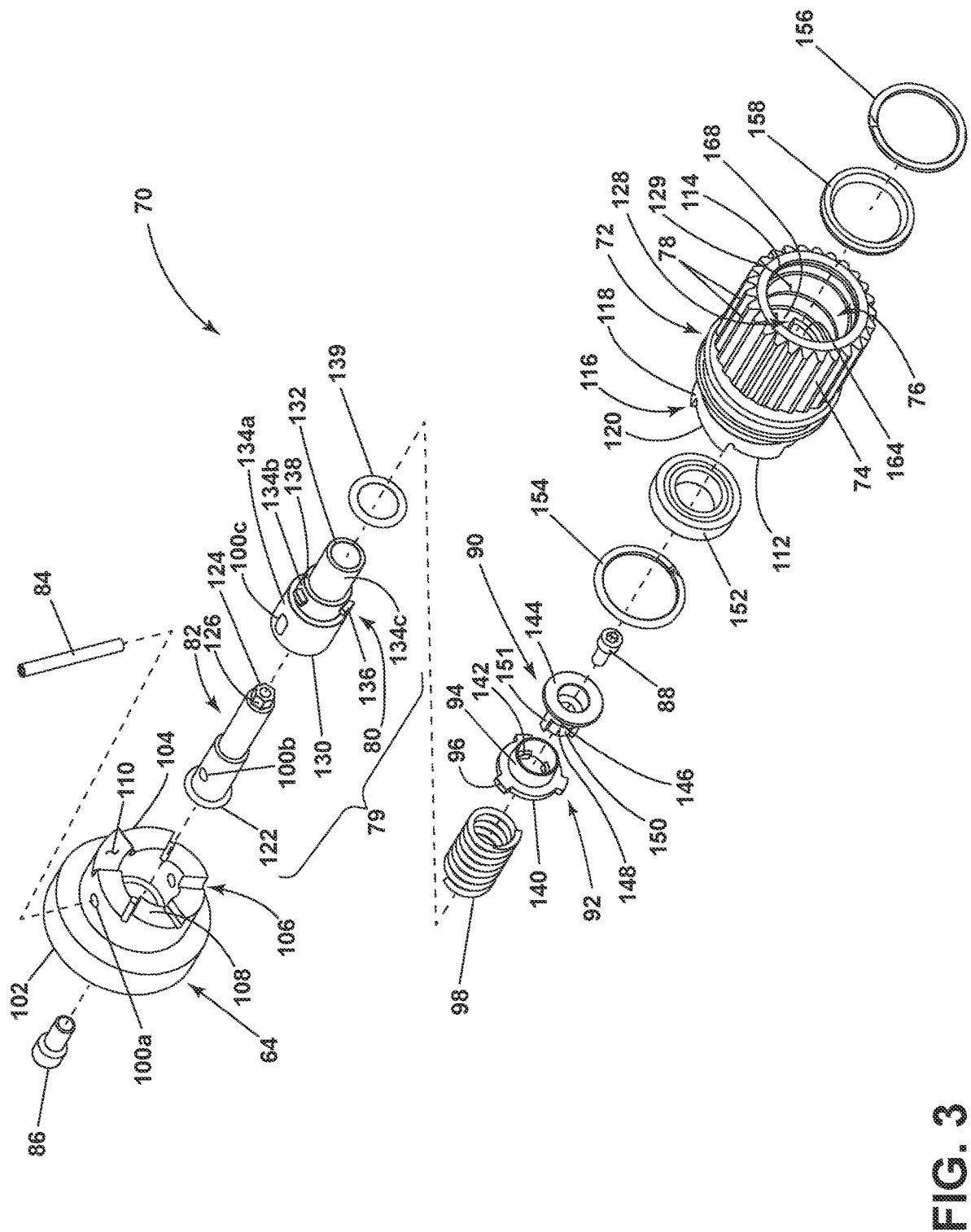
FIG. 3 is an exploded view of portions of the air turbine starter including a drive shaft and the decoupler of FIG. 2.

Turning to FIG. 3, an exploded view of the decoupler 70 is illustrated and it can more clearly be seen that the drive shaft 64, locking shaft 80, and connecting shaft 82 each include pin holes 100a, 100b, 100c that when assembled become aligned to receive the pin 84. The locking shaft 80 includes an elongated pin hole, or slot 100c to allow for axial movement.

The drive shaft 64 extends axially between a clutch end 102 and terminates in a drive end 104. A first set of teeth 106 define the drive end 104. The first set of teeth 106 includes individual teeth 108 each having a ramped portion 110. The ramped portion 110 can be, in non-limiting examples, an inclined portion, an angled portion, or an otherwise oriented portion of the tooth 108 to enable engagement in one direction. While six teeth are illustrated, more or less teeth are contemplated. When assembled the clutch end 102 is operably coupled to the clutch 60 and the drive end 104 faces the output shaft 72. The first set of teeth 106 are configured for driving a torque transfer from the drive shaft 64 to the output shaft 72.

The output shaft 72 extends axially between an output shaft first end 112 and an output shaft second end 114. It can more clearly be seen that the circumferentially distributed teeth 78 can extend axially along the shaft exterior 74 of the output shaft 72 proximate the output shaft second end 114.

The output shaft first end 112 includes a second set of teeth 116 ramped to selectively couple with the first set of teeth 106. The second set of teeth 116 includes individual teeth 118 each including a ramped portion 120 complimentary to the ramped portion 110 of the first set of teeth 106. The output shaft 72 further includes a recess 128 extending radially outward from the hollow interior 76 into an interior surface 129 of the output shaft 72. The recess 128 defines at least one output slot 168 extending axially along the interior surface 129 of the output shaft 72.

The connecting shaft 82 extends axially between the connecting first end 122 and the connecting second end 124. The connecting second end 124 can be, by way of non-limiting example, a hex end 126 as illustrated for coupling with the output bolt 88.

The locking shaft 80 can be formed of consecutively smaller cylindrical portions 134a, 134b, 134c. A large cylindrical portion 134a can define the locking first end 130 and include the slot 100c. An intermediate cylindrical portion 134b can include at least one locking tab 136, by way of non-limiting example illustrated as three locking tabs 136, radially extending from locking shaft 80. A small cylindrical portion 134c can extend from the intermediate cylindrical portion 134b to define a lip 138. A washer 139 can circumscribe the small cylindrical portion 134c. When assembled, the biasing mechanism 98 circumscribes the small cylindrical portion 134c of the locking shaft 80.

The dog clutch 92 includes a dog flanged end 140 from which the hollow shaft 94 extends. The at least one dog tab 96, illustrated as three dog tabs, extends radially outward from the dog flanged end 140. A set of dog inner tabs 142 are located within the hollow shaft.

The limiter cap 90 includes a limiting flanged end 144 from which a hollow cap body 146 extends. The hollow cap body 146 of the limiter cap 90 defines an exterior 148 having a set of cap slots 150 circumferentially distributed about the exterior 148 and defined by a set of cap tabs 151. It should be understood that while three corresponding cap slots 150 and cap tabs 151 are illustrated, any number of cap slots 150, and cap tabs 151 is contemplated. When assembled, the limiting flanged end 144 can be axially spaced from the dog flanged end 140 and the hollow cap body 146 can be selectively received within the hollow shaft 94 of the dog clutch 92, where at least a portion of the hollow shaft 94 surrounds the hollow cap body 146 of the limiter cap 90. More specifically the dog inner tabs 142 can be received in the cap slots 150 of the limiter cap 90.

The decoupler 70 can further include a bearing assembly 152 to enable smooth rotation of the output shaft 72. Retaining rings 154, 156 can also be mounted within the output shaft 72 hollow interior. A cap seal 158 can be provided at the output shaft second end 114 for sealing of the decoupler 70.

Figure 4:
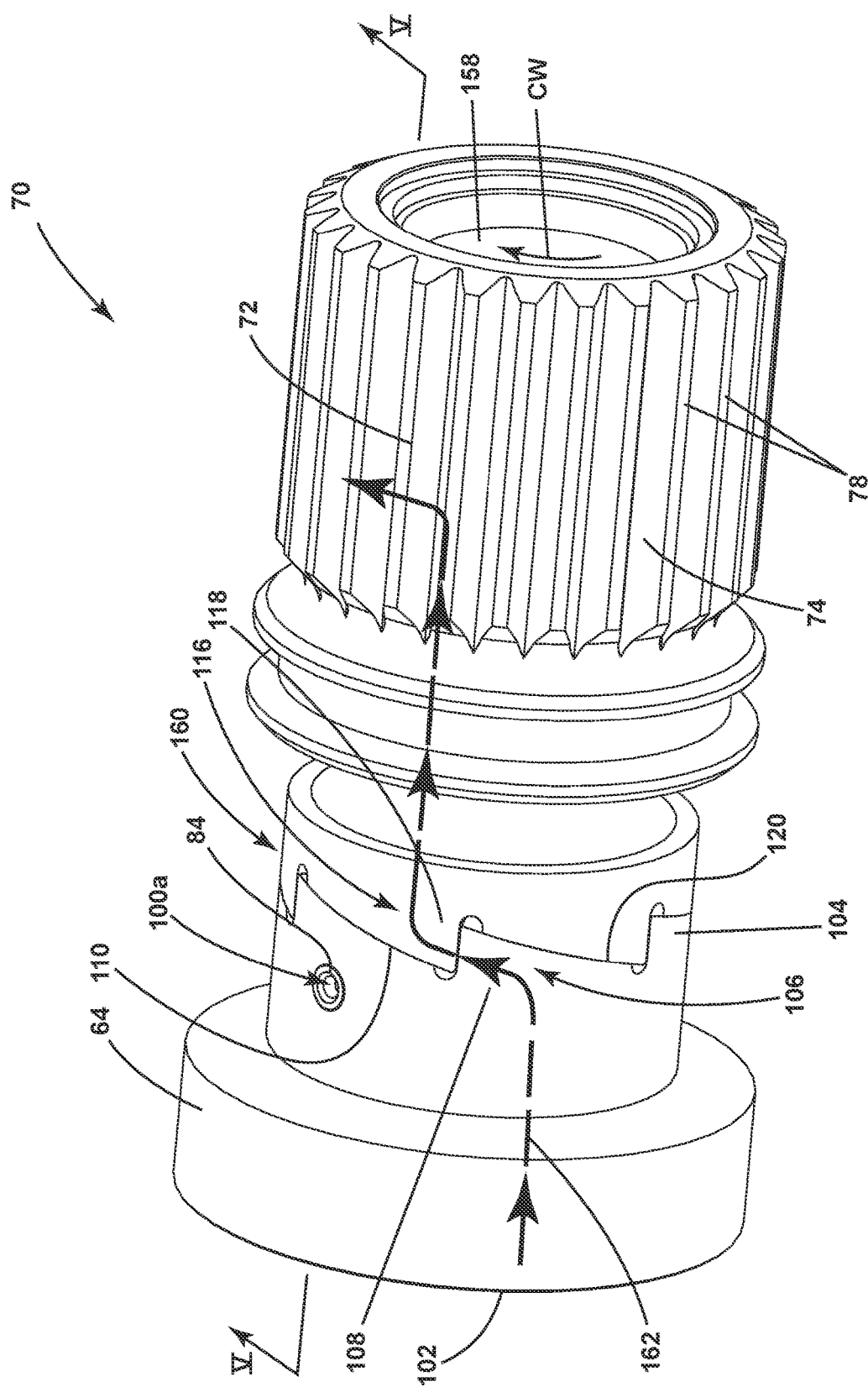
FIG. 4 is a perspective view of the assembled drive shaft and decoupler from FIG. 3 in an engaged position during a normal operating condition.

FIG. 4 is a perspective view of an assembled decoupler 70 during a normal operating condition in an engaged position 160. In the normal operating condition, a torque path illustrated schematically with arrows 162 runs from the drive shaft 64 through the drive end 104 with the first set of teeth 106 to the output shaft first end 112 with the second set of teeth 116, through output shaft 72, and finally continuing to the AGB 12 and engine 14 (FIG. 1) via the circumferentially distributed teeth 78. The torque path 162 allows the first set of teeth 106 to engage with the second set of teeth 116 in order to provide torque to the AGB 12 to start the engine 14 (FIG. 1). The first and second set of teeth 106, 116 enable high torque transfer in one direction along the torque path 162, by way of non-limiting example clockwise (CW) when looking at the cap seal 158.

Figure 5:
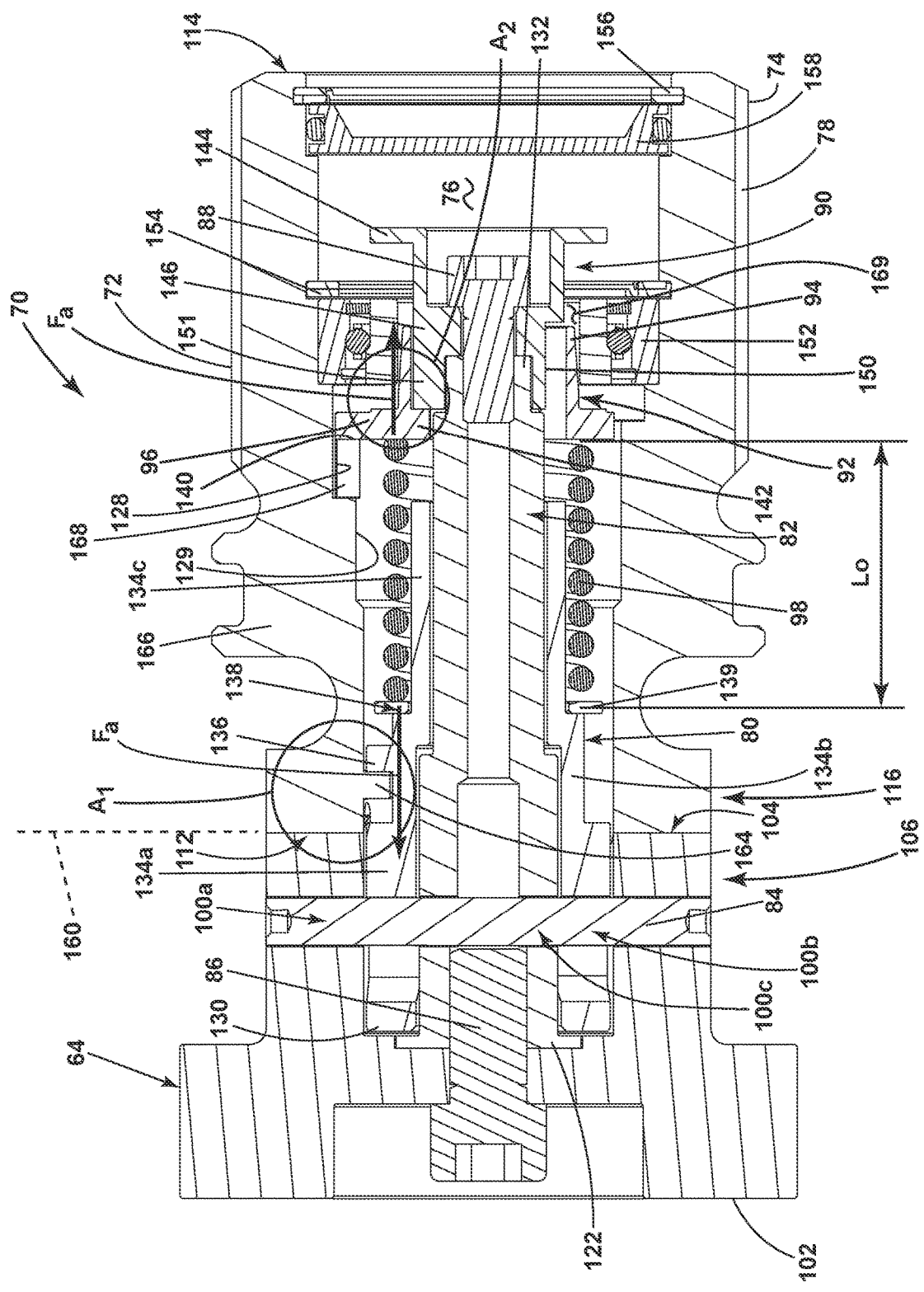
FIG. 5 is a cross-sectional view of the assembled drive shaft and decoupler from FIG. 4.

FIG. 5 is an assembled cross-sectional view of the drive shaft 64 and decoupler 70 in the engaged position 160 along line V-V of FIG. 4. The output shaft 72 further includes at least one output tab 164 extending radially inward from the interior surface 129 of the output shaft 72 into the hollow interior 76. The at least one output tab 164 can be multiple output tabs 164 circumferentially arranged within the hollow interior 76 proximate the output shaft first end 112.

The at least one output slot 168 can be multiple output slots 168 circumferentially arranged along the interior surface 129 of the output shaft 72 offset from both the output shaft first and second ends 112, 114. By way of non-limiting example, the at least one output slot 168 is centrally located with respect to a full length of the output shaft 72 although this need not be the case.

A gap 169 is formed between the bearing assembly 152 and the limiter cap 90. The hollow shaft 94 of the dog clutch 92 is received within the gap 169 during the normal operating condition.

Under normal operating conditions, the biasing mechanism 98 exerts an axial force ($F_a$) in opposing directions ensuring a first axial contact A1 and a second contact A2 remain engaged. Axial contact A1 is between the at least one locking tab 136 and the at least one output tab 164 proximate the output shaft first end 112 and axial contact A2 is between the cap tabs 151 and the dog inner tabs 142. The axial force ($F_a$) is dependent on the amount of compression under which the biasing mechanism 98 has undergone prior to assembly. By way of non-limiting example, the biasing mechanism 98 has an initial compressed length ($L_i$). The biasing element exerts the axial force ($F_a$) on washer 139 which in turn pushes the locking shaft 80 axially toward the drive shaft 64 and locking tab 136 toward output tab 164. The biasing mechanism 98 also exerts the axial force ($F_a$) on the dog flanged end 140 of the dog clutch 92 in turn pushing the dog inner tabs 142 toward cap tabs 151. The output shaft 72 corresponds to an engaged position 160 under normal operating conditions.

Normal operating conditions can include a) a typical mode where the drive shaft 64 and the output shaft 72 are rotating with the same speed and full engagement of the sets of teeth 106 & 116 exists. Additionally normal operating conditions can include b) an overrun mode where engine 14 torque slightly, momentarily exceeds reacting torque of biasing mechanism 98. The first and second set of teeth 106, 116 remain engaged through ramped portions 110, 120 only. In other words, in an overrun mode, slipping can occur, but frictional resistance of the ramped portions 110, 120 along with the axial force ($F_a$) keep the drive shaft 64 and output shaft 72 engaged. This enables the decoupler 70 to resist a "nuisance failure" or a scenario in which at temporary torque spike occurs but is not maintained for a long period of time.

Figure 6:
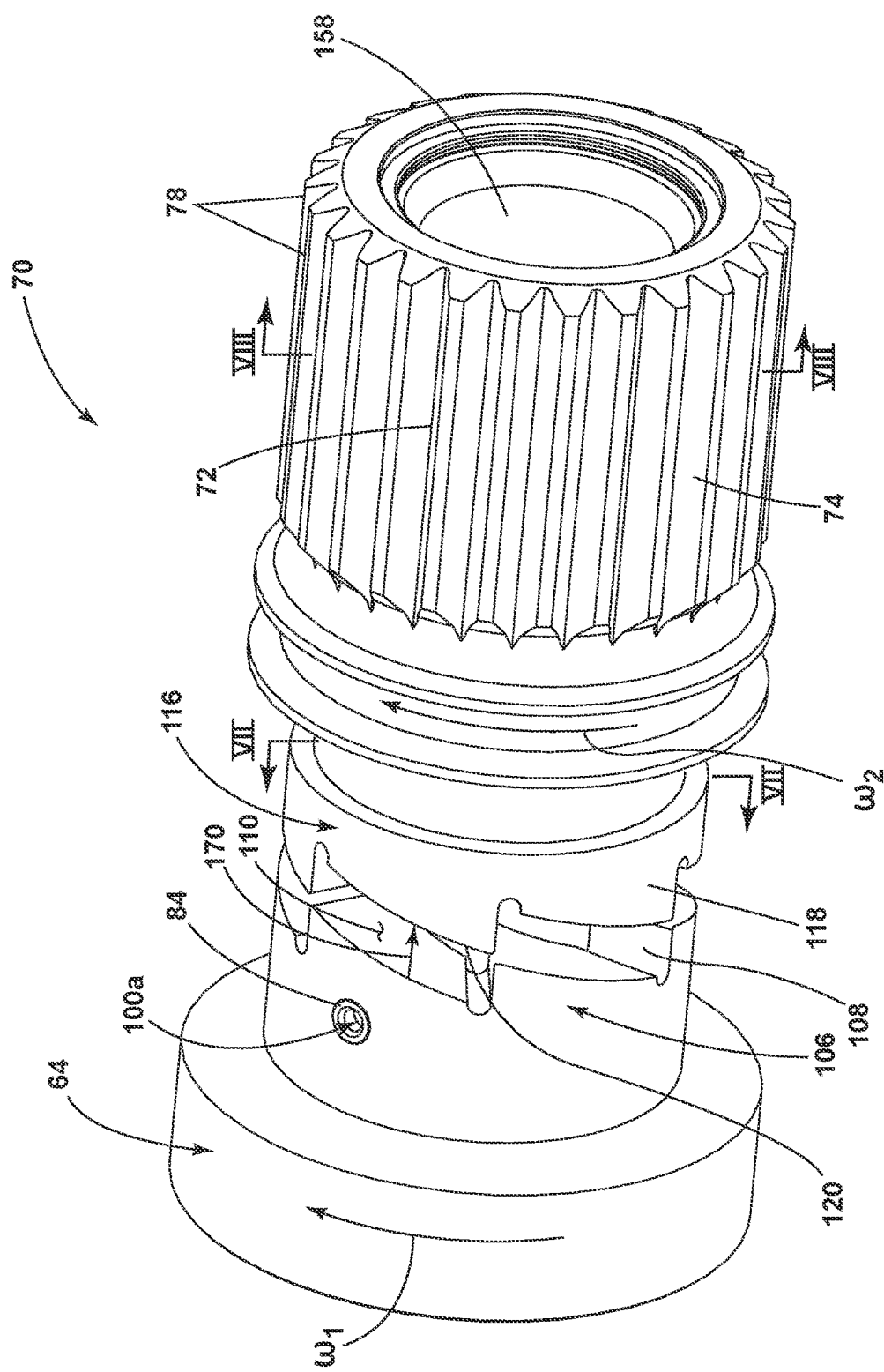
FIG. 6 is a perspective view of the assembled drive shaft and decoupler during a back-drive mode of operation.

FIG. 6 is a perspective view of the assembled decoupler 70 at the beginning of a back-drive mode of operation. The beginning of the back-drive mode of operation occurs when the first and second set of teeth 106, 116 disengage from each other due to the second set of teeth 116 moving at a higher angular velocity ($\omega_2$) than an angular velocity ($\omega_1$) of the first set of teeth 106. This would cause slipping along the ramped portions 110, 120 resulting in the output shaft 72 moving away from the drive shaft 64 through an axial translation 170. In order for the decoupler to move into a full back-drive mode, the frictional resistance between ramped portions 110, 120 is not enough to overcome the torque spike.

Figure 7:
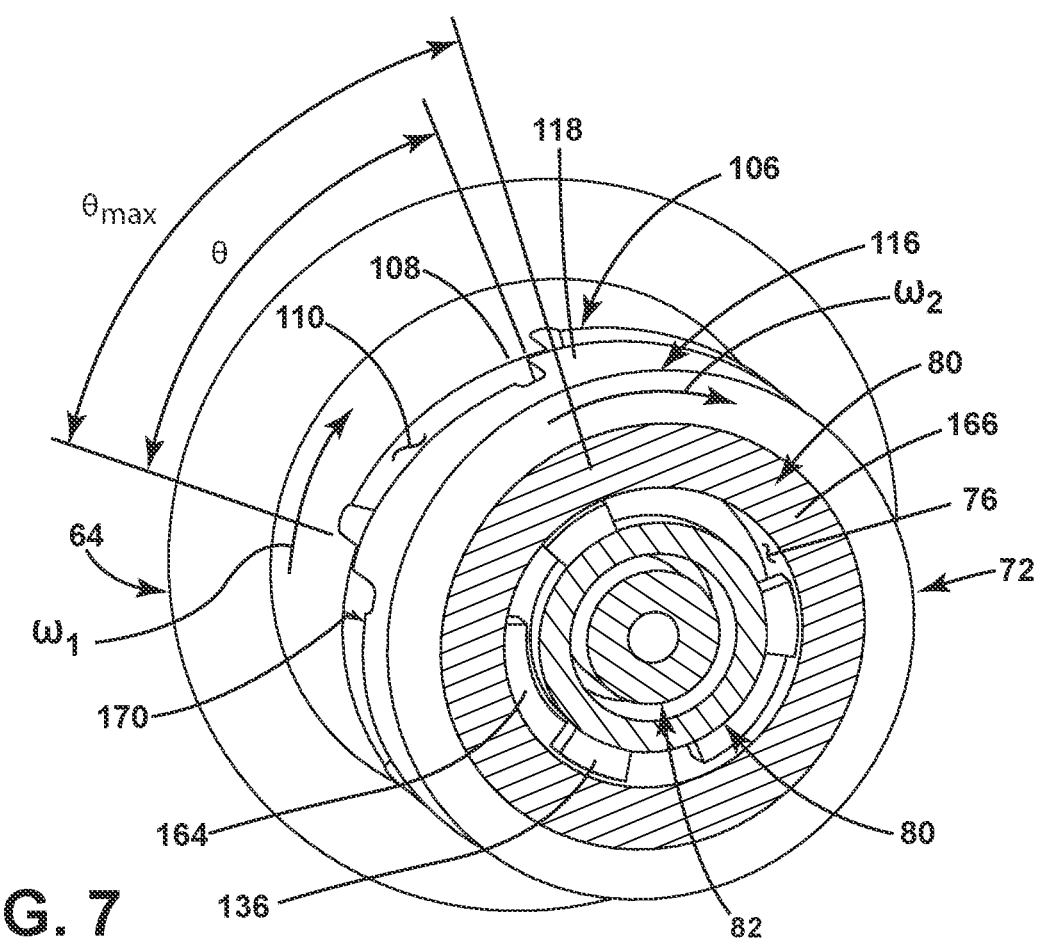
FIG. 7 is a cross-sectional view along line VII-VII of FIG. 6 where the drive shaft meets an output shaft of the decoupler illustrating a locking shaft and a connecting shaft at a beginning of the back-drive mode of operation.

FIG. 7 is an isometric cross-sectional view taken along line VII-VII of FIG. 6 at the beginning of a back-drive mode. During the beginning of the back-drive mode of operation, the output shaft 72 is able to turn through an angle ($\theta$) less than a maximum angle ($\theta_{max}$) with respect to the drive shaft 64. When the drive shaft 64 has failed due to failure of the clutch 60, the engine 14 may be spinning momentarily faster than the drive shaft 64, then if the maximum angle ($\theta_{max}$) is not reached, the engine 14 and ATS 10 remain coupled.

Figure 8:
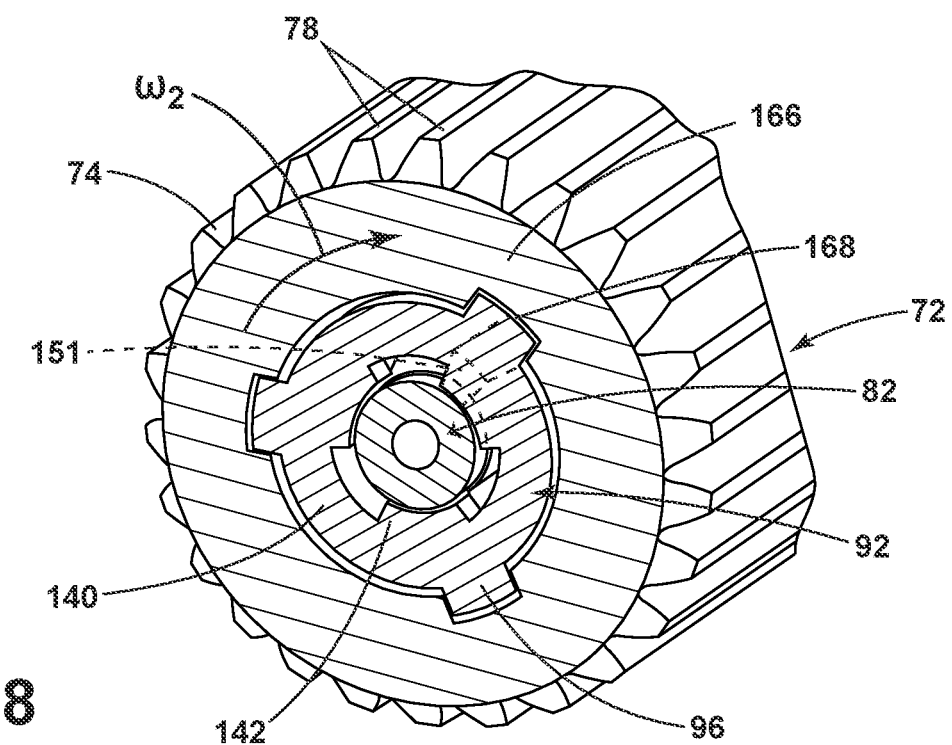
FIG. 8 is a cross-sectional view along line VIII-VIII of FIG. 6 at a mid-portion of the output shaft of the decoupler illustrating the connecting shaft and a dog clutch during the beginning of the back-drive mode of operation.

Turning to FIG. 8 an isometric cross-sectional view taken along line VIII-VIII of FIG. 6 illustrating what is simultaneously occurring in the drive shaft 64 on the other end of the decoupler 70 with respect to FIG. 7. At the beginning of the back-drive mode of operation the at least one dog tab 96, which extends from the dog flanged end 140, is circumferentially engaged with the at least one output slot 168 such that they turn together. And the dog inner tabs 142 are axially engaged with the cap tabs 151 (one illustrated in phantom). Both tabs operate to secure the engine 14 and ATS 10 and ensure they remain coupled to each other.

Figure 9:
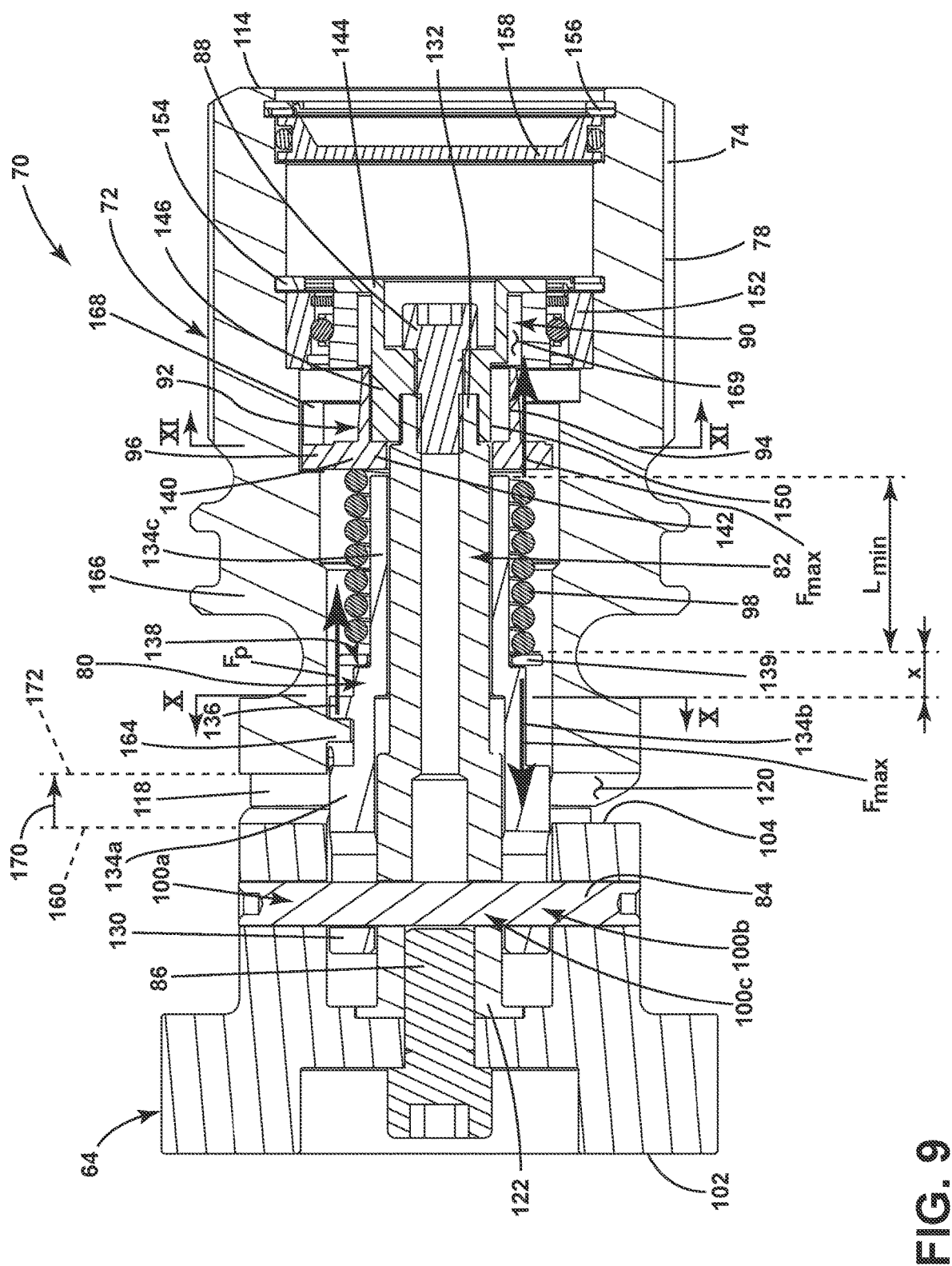
FIG. 9 is a cross-sectional view of the assembled drive shaft and decoupler from FIG. 3 in a first position during a back-drive condition.

FIG. 9 is an assembled cross-sectional view of the decoupler 70 in a first position 172 under a back-drive condition, when decoupler 70 has moved beyond the beginning of the back-drive and a rapid difference in speeds between the output shaft 72 and drive shaft 64 occur. An exemplary scenario is where the overrunning of the engine to the ATS 10 has reached the maximum angle ($\theta_{max}$) allowable. In this scenario, the axial translation 170 has reached a maximum, causing the output tab 164 to exert a pushing force ($F_p$) on the locking tab 136 which in turn moves the locking shaft 80 axially away from the drive shaft 64. This movement causes the compression spring illustrated to become compressed a compression distance (x) corresponding to a final compressed length ($L_f$) of the biasing mechanism 98, in other words the compression spring illustrated is compressed to a point of exerting the largest axial force ($F_{max}$). Up until this point, the pushing force ($F_p$) did not overcome the axial force ($F_a$) exerted by the biasing mechanism 98. When the compression distance (x) is reached, a maximum axial force ($F_{max}$) is also imparted on corresponding parts of the decoupler 70, the biasing mechanism 98 on the washer 139 and in turn on the lip 138 which engages the locking tab 136 with the output tab 164.

The axial translation, illustrated schematically with arrow 170, of the output shaft 72 causes the bearing assembly 152 to also move which results in movement of the hollow shaft 94 out of the gap 169. The axial translation 170 of the output shaft 72, and in turn the locking shaft 80 causes the biasing mechanism 98 to compress.

Figure 10:
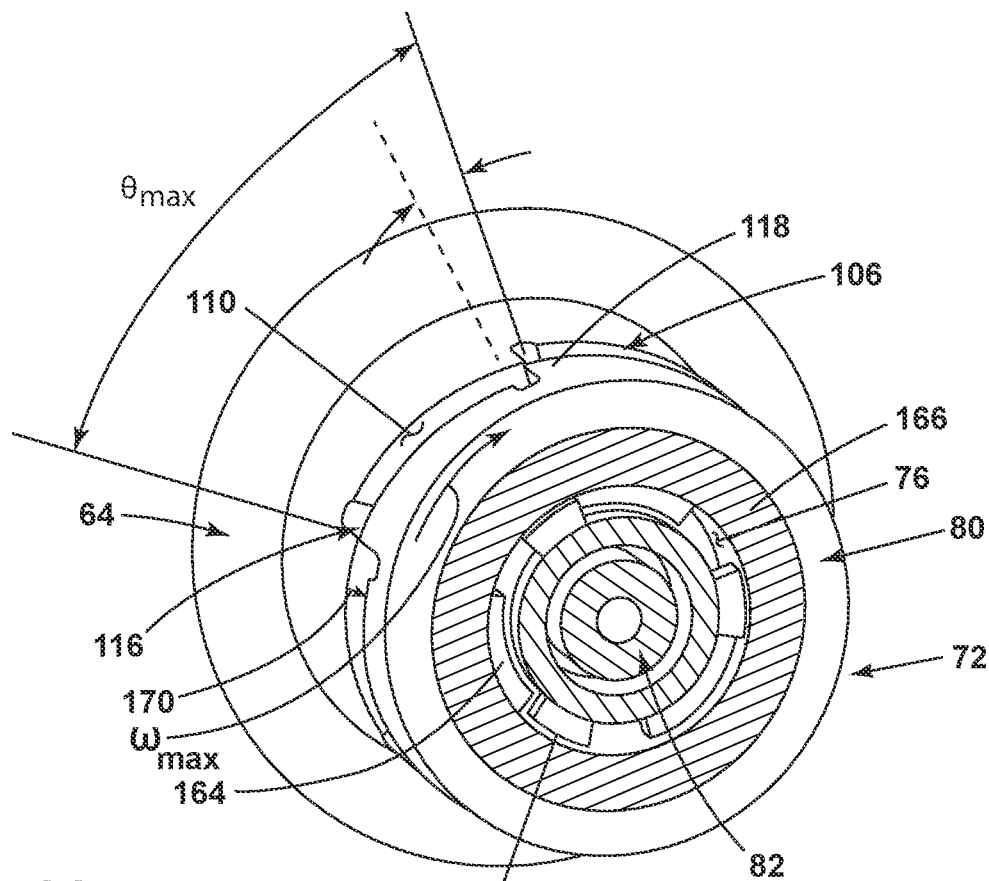
FIG. 10 is a cross-sectional view along line X-X of FIG. 9 where the drive shaft meets the output shaft of the decoupler illustrating the locking shaft and connecting shaft in the first position.

FIG. 10 is an isometric cross-sectional view taken along line X-X of FIG. 9. In the first position 172 of the back-drive condition, the output shaft 72 is approaching the maximum angle ($\theta_{max}$). This turning 173, illustrated in phantom, of the output shaft 72 causes the output tab 164 to rotate to a point where an axial engagement with the locking tab 136 no longer exists and triggers the decoupling of locking shaft 80.

Figure 11:
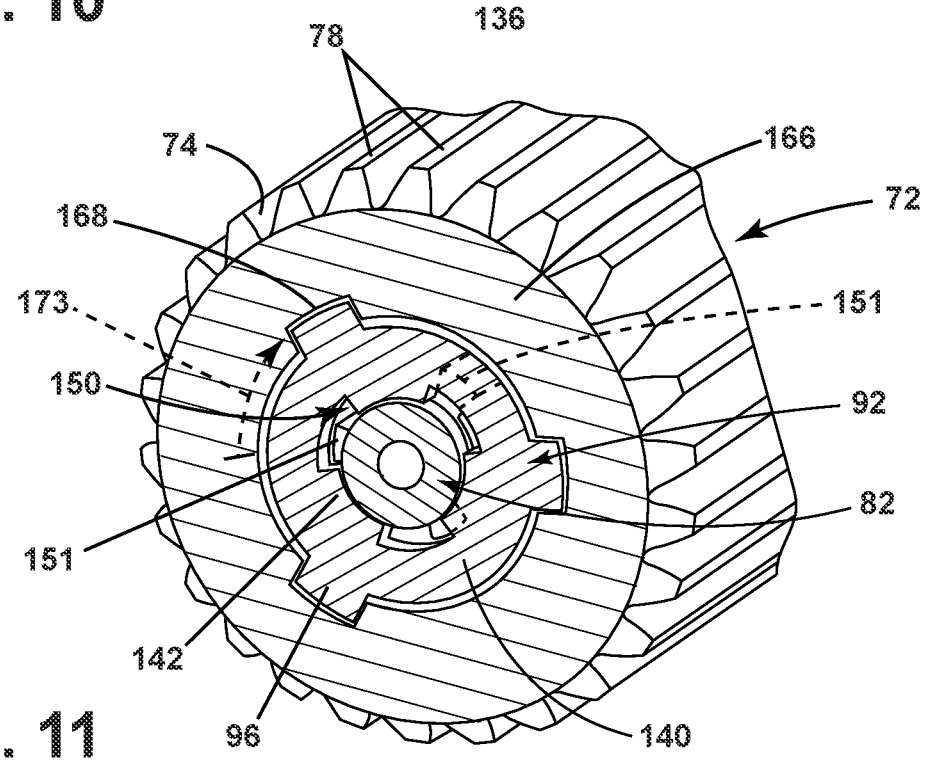
FIG. 11 is a cross-sectional view along line XI-XI of FIG. 9 at the mid-portion of the output shaft of the decoupler illustrating the connecting shaft and the dog clutch in the first position.

Simultaneously, turning to FIG. 11 an isometric cross-sectional view taken along line XI-XI of FIG. 10 illustrates what is simultaneously occurring in the drive shaft 64 on the other end of the decoupler 70 with respect to FIG. 10. In the first position 172 of the back-drive condition for the decoupler 70, the at least one dog tab 96 remains circumferentially engaged with the output slot 168 of the output shaft 72. The continuous rotation of the output shaft 72 toward the maximum angle ($\theta_{max}$) results in an aligning of the dog inner tab 142 and the cap slots 150. Therefore, an axial engagement between the dog inner tab 142 and the cap tabs 151 no longer exists triggering an axial disconnect of the dog clutch 92.

Figure 12:
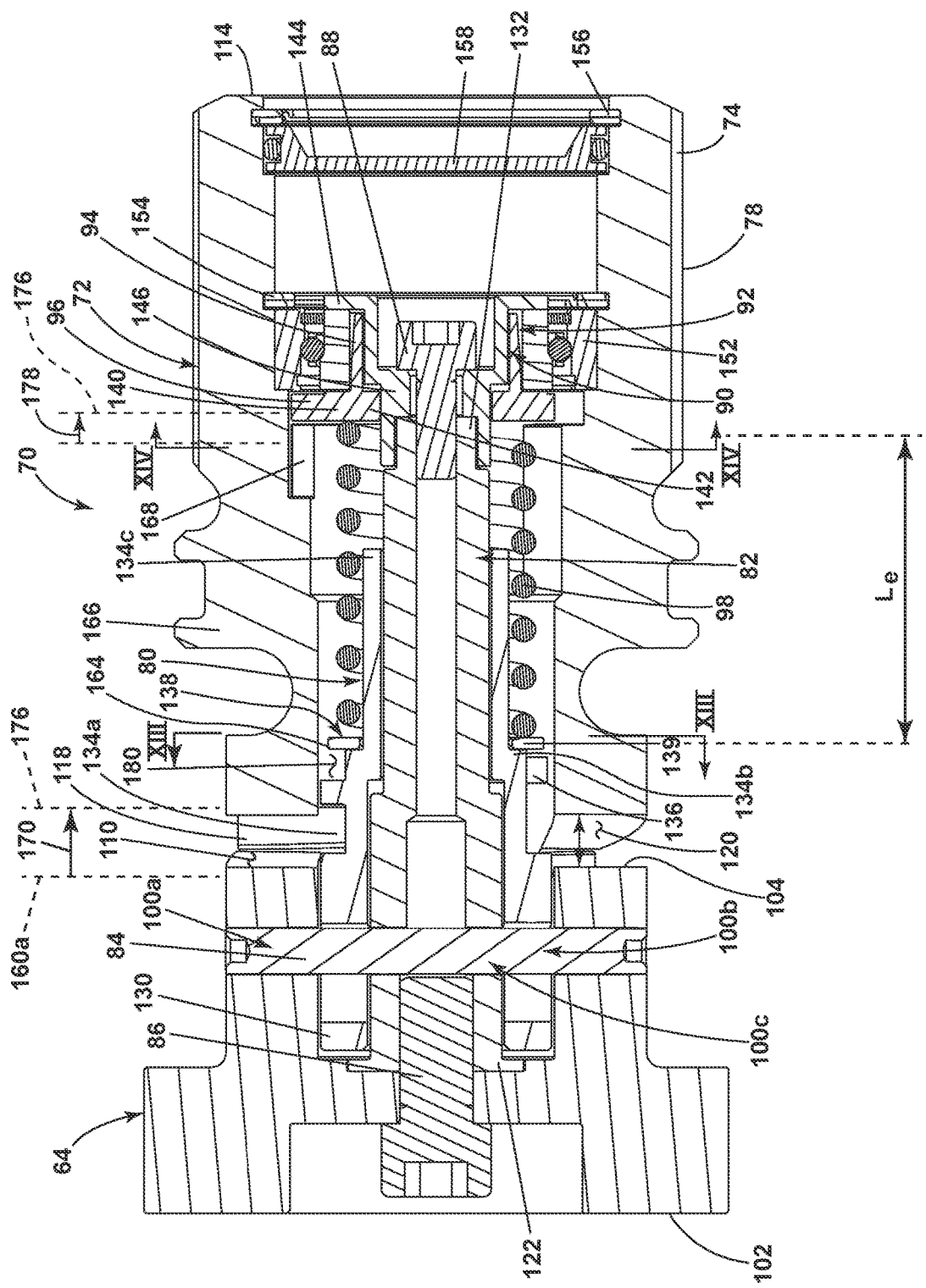
FIG. 12 is a cross-sectional view of portions of the assembled drive shaft and decoupler from FIG. 3 in a second position during the back-drive condition.

FIG. 12 is an assembled cross-sectional view of the decoupler 70 in a second position 176 under a back-drive condition when the tabs 136, 164, 151, 142 as described above are no longer axially engaged. The overrunning of the engine 14 (FIG. 1) to the ATS 10 (FIG. 2) has reached the maximum angle ($\theta_{max}$) allowable, relative to shaft 64. At this point the maximum axial force ($F_{max}$) along with the unalignment of the tabs 136, 164, 151, 142 described in FIG. 9 and FIG. 10 cause the locking shaft 80 and dog clutch 92 to move axially away from each other. The biasing mechanism 98 expands to an expanded length (Le) pushing the locking shaft 80 toward the drive shaft 64 and the hollow shaft 94 of the dog clutch 92 back into the gap 169 when the dog clutch 92 undergoes an axial translation 178 out of the output slot 168.

When the decoupler 70 is in the second position 176 the output shaft 72 is in a completely rotationally disengaged position from the drive shaft 64, locking shaft 80, connecting shaft 82, limiter cap 90 and dog clutch 92. In this manner the output shaft 72 is the only object spinning in FIG. 12. While the output shaft 72 is allowed to freely spin, the connecting shaft 82 remains coupled to both the drive shaft 64 and the limiter cap 90.

The second position 176 is a reversible position. No parts of the decoupler 70 are broken or fractured in the second position 176, and yet post decouple re-engagement is prevented by the biasing mechanism pushing the dog clutch 92 away from the output shaft 72 and more particularly the dog tabs 96 away from the output slots 168. After the maximum angle ($\theta_{max}$) is reached the output shaft 72 is completely decoupled from the ATS 10 while remaining stabilized by the bearing assembly 152, in order to protect all parts against wear, from possible bouncing around, and enabling them for later reuse. The engine 14 can therefore complete, by way of non-limiting example a flight trip, and after the flight trip the decoupler 70 can be re-set in order to restart the engine 14.

Figure 13:
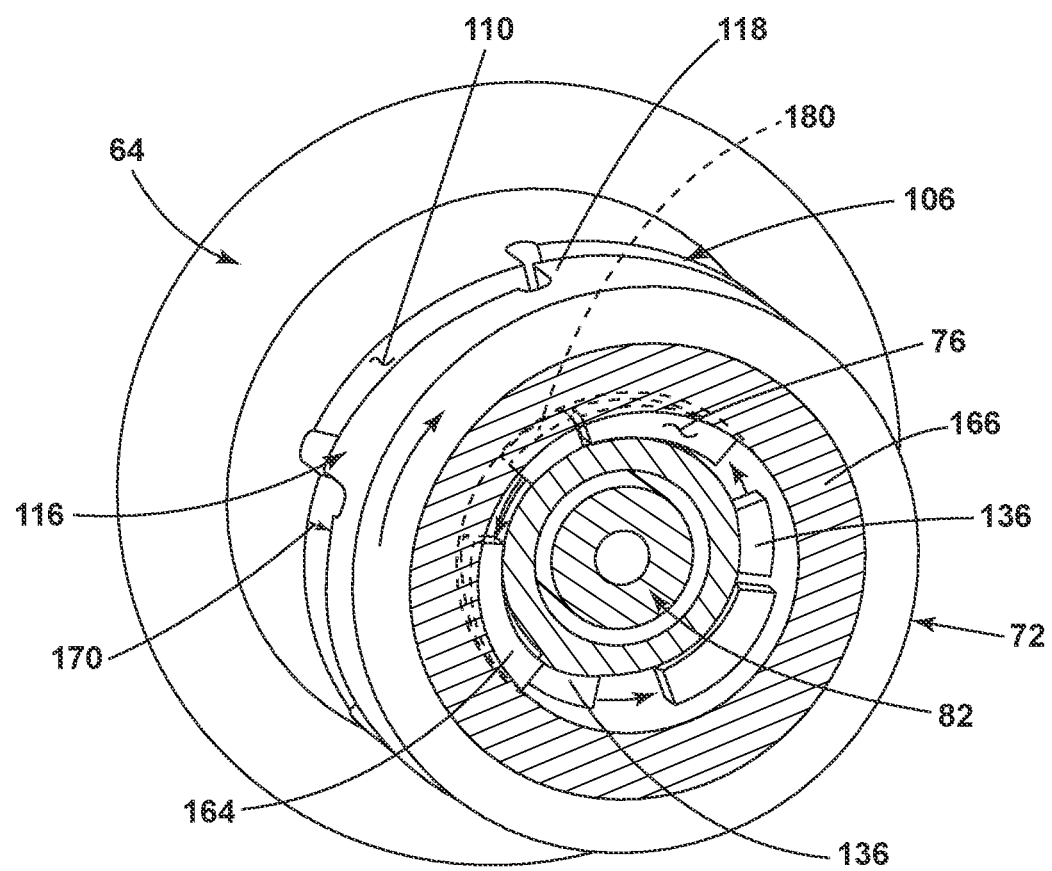
FIG. 13 is a cross-sectional view along line XIII-XIII of FIG. 12 where the drive shaft meets the output shaft of the decoupler illustrating the locking shaft and connecting shaft in the second position.

FIG. 13 is an isometric cross-sectional view taken along line XIII-XIII of FIG. 12. In the second position 176 of the back-drive condition, the output shaft 72 can freely rotate. This turning of the output shaft 72 is enabled due to no circumferential engagement between the output tab 164 and the locking tab 136. The locking tab 136 is moved axially closer to the drive shaft 64 into a space 180 formed between the body 166 of the output shaft 72 and the locking shaft 80 and in this space 180, the locking tabs 136 can freely rotate.

Figure 14:
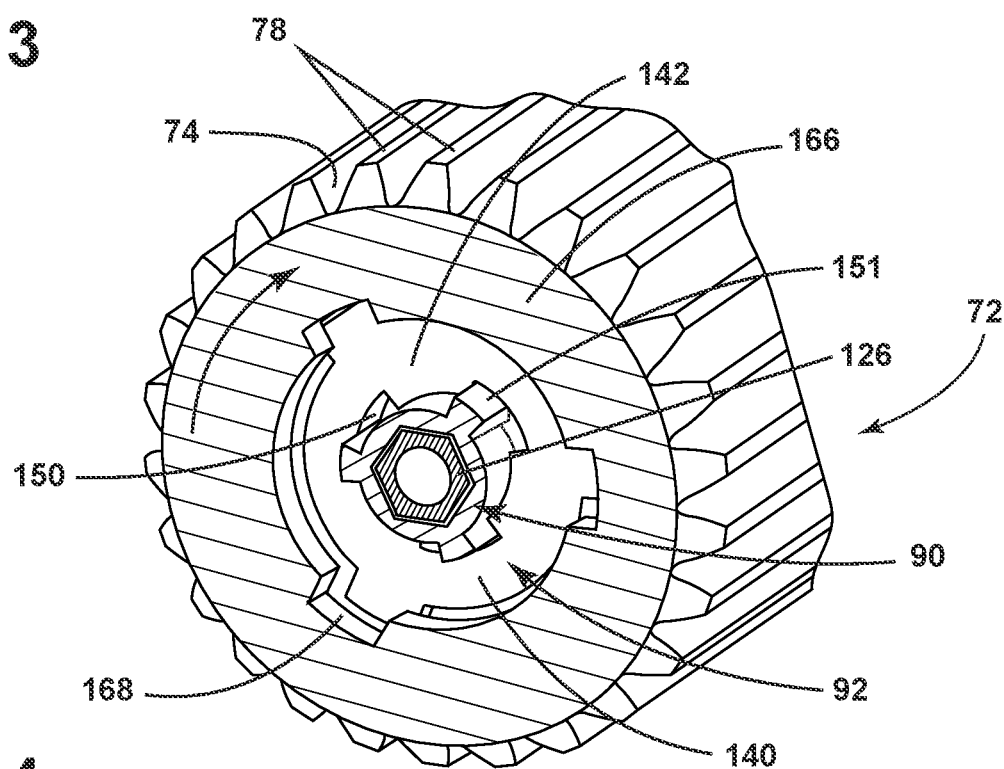
FIG. 14 is a cross-sectional view along line XIV-XIV of FIG. 12 at the mid-portion of the output shaft of the decoupler illustrating the connecting shaft and a limiter cap in the second position.

FIG. 14 is an isometric cross-sectional view taken along line XII-XII of FIG. 10. It can more clearly be seen that the dogged flanged end 140 is completely disengaged from the output slots 168 of the output shaft 72. Without any circumferential engagement, the output shaft 72 can freely rotate while the dog clutch 92 remains stationary.

Benefits associated with the decoupler described herein include enabling re-engagement of the decoupler and the drive shaft after a back-drive condition without the need for replacement parts or removing broken/fragmented parts. This decreases costs associated with parts and maintenance because no new or replacement parts are required and the same decoupler can be used again.

Additionally, advantages associated with the decoupler described herein include minimizing the possibility of unintentional re-engagement of the output shaft. This includes preventing undesirable back driving of the starter for a turbine engine. By preventing back driving, wear to the parts described herein, in particular the drive shaft and output shaft decrease. Decreasing wear in turn increases the life of the parts. The decoupler assemblies as described herein enable lower maintenance cost and easy repair. The connector can provide alignment between both the drive shaft and output shaft.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects of the disclosure herein, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure herein are provided by the subject matter of the following clauses:

1. An air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member, a drive shaft operably coupled with the gear train, and a decoupler, comprising an output shaft extending axially between an output shaft first end coupled to the drive shaft and an output shaft second end configured to be operably coupled to and rotate with the engine, defining an interior including at least one output tab extending radially inward and at least one output slot extending radially outward, a connecting shaft extending axially between a connecting first end coupled to the drive shaft and a connecting second end located within the interior of the output shaft, a limiter cap comprising a limiting flanged end from which a hollow cap body extends operably coupled to the connecting second end of the connecting shaft, a locking shaft circumscribing the connecting shaft and including at least one locking tab axially engaged with the at least one output tab under a normal operating condition, a dog clutch having a dog flanged end and a hollow shaft extending axially from the dog flanged end, the hollow shaft circumscribing at least a portion of the limiter cap, the dog flanged end including at least one dog tab received within the at least one output slot of the output shaft under the normal operating condition.

2. The air turbine starter of any of the preceding clauses, wherein the drive shaft terminates in a drive end having a first set of teeth configured for driving torque transfer from the drive shaft to the output shaft.

3. The air turbine starter of any of the preceding clauses, wherein the output shaft further comprises a second set of teeth ramped and selectively couplable with the first set of teeth, where the first and second set of teeth are configured to slide on each other when a back-drive torque is transmitted such that the output shaft and locking shaft are simultaneously moved away from the drive shaft.

4. The air turbine starter of any of the preceding clauses, further comprising a bearing assembly spaced from and circumscribing the hollow cap body to define a gap.

5. The air turbine starter of any of the preceding clauses, wherein the hollow shaft is selectively received within the gap.

6. The air turbine starter of any of the preceding clauses, further comprising a biasing element configured to axially shift the locking shaft and dog clutch away from each other under a back-drive condition causing the at least one dog tab to disengage from the at least one output slot of the output shaft.

7. The air turbine starter of any of the preceding clauses, wherein the locking shaft further comprises a lip axially spaced from the locking tab.

8. The air turbine starter of any of the preceding clauses, further comprising a washer circumscribing the locking shaft along the lip and configured to transfer an axial force to the locking shaft from the biasing element.

9. The air turbine starter of any of the preceding clauses, further comprising a set of cap tabs circumferentially arranged on an exterior of the hollow cap body.

10. The air turbine starter of any of the preceding clauses, wherein the set of cap tabs defines a set of cap slots and the dog clutch further comprises a set of dog projections selectively received within the set of cap slots.

11. The air turbine starter of any of the preceding clauses, wherein the at least one output tab is located proximate the output first end and the output slot is offset from both the output first end and the output second end.

12. The air turbine starter of any of the preceding clauses, wherein the connecting shaft is coupled to the drive shaft via a pin at the connecting first end and bolted to the limiter cap at the connecting second end to provide rotational alignment between the drive shaft and the output shaft.

13. A decoupler for selectively disengaging a drive shaft from an engine, the decoupler comprising an output shaft defining a hollow interior and having an output first end operably coupled to and rotatable with the drive shaft and an output second end operably coupled to and rotatable with the engine, and a decoupler shaft assembly located within the hollow interior and moveable between an engaged position wherein at least a portion of the decoupler shaft assembly is engaged with an interior surface of the output shaft and a disengaged position wherein the decoupler shaft assembly is decoupled from the output shaft in the disengaged position, wherein the decoupler shaft is manually resettable to the engaged position via rotation and axial movement and remains decoupled by preventing circumferential engagement of the output shaft with the decoupler shaft.

14. The decoupler of any of the preceding clauses, wherein the decoupler shaft assembly comprises a connecting shaft and a locking shaft.

15. The decoupler of any of the preceding clauses, wherein the hollow interior defines an interior surface including at least one output tab extending radially inward from the interior surface and at least one output slot extending radially outward into the interior surface to define a recess.

16. The decoupler of any of the preceding clauses, wherein the connecting shaft extends axially between a connecting first end coupled to the drive shaft and a connecting second end located within the interior of the output shaft and the locking shaft circumscribes the connecting shaft and includes at least one locking tab axially engaged with the at least one output tab under a normal operating condition.

17. The decoupler of any of the preceding clauses, further comprising a limiter cap having a hollow cap body extending between a coupling end and a limiting flanged end, the coupling end operably coupled to the connecting second end of the connecting shaft and the limiting flanged end.

18. The decoupler of any of the preceding clauses, further comprising a dog clutch having a dog flanged end and a hollow shaft extending axially from the dog flanged end, the hollow shaft circumscribing at least a portion of the limiter cap, the dog flanged end including at least one dog tab received within the at least one output slot of the output shaft in the engaged position and in the disengaged position the at least one dog tab is prevented from being received within the output slot.

19. The decoupler of any of the preceding clauses, further comprising a set of cap tabs circumferentially arranged on an exterior of the hollow cap body wherein the set of cap tabs defines a set of cap slots and the dog clutch further comprises a set of dog projections selectively received within the set of cap slots.

20. The decoupler of any of the preceding clauses, further comprising a bearing assembly spaced from and circumscribing the hollow cap body to define a gap wherein the hollow shaft is axially movable into and out of the gap when the decoupler moves between the engaged and disengaged position.

What is claimed is:

1. An air turbine starter for starting an engine, comprising:
a housing defining an inlet, an outlet, and a flow path extending between the inlet and the outlet for communicating a flow of gas there through;
a turbine member journaled within the housing and disposed within the flow path for rotatably extracting mechanical power from the flow of gas;
a gear train drivingly coupled with the turbine member;
a drive shaft operably coupled with the gear train; and
a decoupler, comprising:
an output shaft extending axially between an output shaft first end coupled to the drive shaft and an output shaft second end configured to be operably coupled to and rotate with the engine, defining an interior including at least one output tab extending radially inward and at least one output slot extending radially outward,
a connecting shaft extending axially between a connecting first end coupled to the drive shaft and a connecting second end located within the interior of the output shaft,
a limiter cap comprising a limiting flanged end from which a hollow cap body extends operably coupled to the connecting second end of the connecting shaft,
a locking shaft circumscribing the connecting shaft and including at least one locking tab axially engaged with the at least one output tab under a normal operating condition,
a dog clutch having a dog flanged end and a hollow shaft extending axially from the dog flanged end, the hollow shaft circumscribing at least a portion of the limiter cap, the dog flanged end including at least one dog tab received within the at least one output slot of the output shaft under the normal operating condition.

2. The air turbine starter of claim 1, wherein the drive shaft terminates in a drive end having a first set of teeth configured for driving torque transfer from the drive shaft to the output shaft.

3. The air turbine starter of claim 2, wherein the output shaft further comprises a second set of teeth ramped and selectively couplable with the first set of teeth, where the first and second set of teeth are configured to slide on each other when a back-drive torque is transmitted such that the output shaft and locking shaft are simultaneously moved away from the drive shaft.

4. The air turbine starter of claim 1, further comprising a bearing assembly spaced from and circumscribing the hollow cap body to define a gap.

5. The air turbine starter of claim 4, wherein the hollow shaft is selectively received within the gap.

6. The air turbine starter of claim 1, further comprising a biasing element configured to axially shift the locking shaft and dog clutch away from each other under a back-drive condition causing the at least one dog tab to disengage from the at least one output slot of the output shaft.

7. The air turbine starter of claim 6, wherein the locking shaft further comprises a lip axially spaced from the locking tab.

8. The air turbine starter of claim 7, further comprising a washer circumscribing the locking shaft along the lip and configured to transfer an axial force to the locking shaft from the biasing element.

9. The air turbine starter of claim 1, further comprising a set of cap tabs circumferentially arranged on an exterior of the hollow cap body.

10. The air turbine starter of claim 9, wherein the set of cap tabs defines a set of cap slots and the dog clutch further comprises a set of dog inner tabs selectively received within the set of cap slots.

11. The air turbine starter of claim 1, wherein the at least one output tab is located proximate the output shaft first end and the at least one output slot is offset from both the output shaft first end and the output shaft second end.

12. The air turbine starter of claim 1, wherein the connecting shaft is coupled to the drive shaft via a pin at the connecting first end and bolted to the limiter cap at the connecting second end to provide rotational alignment between the drive shaft and the output shaft.

13. A decoupler for selectively disengaging a drive shaft from an engine, the decoupler comprising:
an output shaft defining a hollow interior and having an output first end operably coupled to and rotatable with the drive shaft and an output second end operably coupled to and rotatable with the engine;

at least one output tab extending radially inward from an interior surface of the output shaft and at least one output slot extending radially outward into the interior surface to define a recess; and a decoupler shaft assembly located within the hollow interior and moveable between an engaged position wherein at least a portion of the decoupler shaft assembly is engaged with the interior surface and a disengaged position wherein the decoupler shaft assembly is decoupled from the output shaft in the disengaged position;

wherein the decoupler shaft is manually resettable to the engaged position via rotation and axial movement and remains decoupled by preventing circumferential engagement of the output shaft with the decoupler shaft.

14. The decoupler of claim 13, wherein the decoupler shaft assembly comprises a connecting shaft and a locking shaft.

15. The decoupler of claim 14, wherein the connecting shaft extends axially between a connecting first end coupled to the drive shaft and a connecting second end located within the interior of the output shaft and the locking shaft circumscribes the connecting shaft and includes at least one locking tab axially engaged with the at least one output tab under a normal operating condition.

16. The decoupler of claim 15, further comprising a limiter cap having a hollow cap body extending between a coupling end and a limiting flanged end, the coupling end operably coupled to the connecting second end of the connecting shaft and the limiting flanged end.

17. The decoupler of claim 16, further comprising a dog clutch having a dog flanged end and a hollow shaft extending axially from the dog flanged end, the hollow shaft circumscribing at least a portion of the limiter cap, the dog flanged end including at least one dog tab received within the at least one output slot of the output shaft in the engaged position and in the disengaged position the at least one dog tab is prevented from being received within the at least one output slot.

18. The decoupler of claim 17, further comprising a set of cap tabs circumferentially arranged on an exterior of the hollow cap body wherein the set of cap tabs defines a set of cap slots and the dog clutch further comprises a set of dog inner tabs selectively received within the set of cap slots.

19. The decoupler of claim 18, further comprising a bearing assembly spaced from and circumscribing the hollow cap body to define a gap wherein the hollow shaft is axially movable into and out of the gap when the decoupler moves between the engaged and disengaged position.

20. An air turbine starter for starting an engine, comprising:

a housing defining an inlet, an outlet, and a flow path extending between the inlet and the outlet for communicating a flow of gas there through;

a turbine member journaled within the housing and disposed within the flow path for rotatably extracting mechanical power from the flow of gas;

a gear train drivingly coupled with the turbine member;

a drive shaft operably coupled with the gear train; and a decoupler, comprising:

an output shaft defining a hollow interior and having an output first end operably coupled to and rotatable with the drive shaft and an output second end operably coupled to and rotatable with the engine;

a decoupler shaft assembly located within the hollow interior and moveable between an engaged position wherein at least a portion of the decoupler shaft assembly is engaged with an interior surface of the output shaft and a disengaged position wherein the decoupler shaft assembly is decoupled from the output shaft in the disengaged position;

at least one output tab extending radially inward from the interior surface; and a locking shaft located within the hollow interior and including at least one locking tab axially engaged with the at least one output tab under a normal operating condition.

* * * * *